United States Patent
Kamibayashi et al.

(10) Patent No.: US 9,677,543 B2
(45) Date of Patent: Jun. 13, 2017

(54) STRUCTURE FOR NACELLE COVER CONNECTION PORTION OF WIND TURBINE GENERATOR

(75) Inventors: Masakazu Kamibayashi, Tokyo (JP); Haruhiko Hirano, Tokyo (JP); Tomohiro Numajiri, Tokyo (JP); Kenji Ito, Yokohama (JP); Ikuo Honda, Yokohama (JP); Yoshihiro Fujioka, Nagasaki (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 947 days.

(21) Appl. No.: 13/881,564

(22) PCT Filed: Nov. 1, 2011

(86) PCT No.: PCT/JP2011/075171
§ 371 (c)(1),
(2), (4) Date: Jun. 18, 2013

(87) PCT Pub. No.: WO2012/060370
PCT Pub. Date: May 10, 2012

(65) Prior Publication Data
US 2013/0259677 A1    Oct. 3, 2013

(30) Foreign Application Priority Data

Nov. 1, 2010  (JP) ................................. 2010-245219

(51) Int. Cl.
*F03D 9/00* (2016.01)
*F03D 1/00* (2006.01)

(52) U.S. Cl.
CPC ............. *F03D 9/002* (2013.01); *F03D 1/001* (2013.01); *F05B 2230/604* (2013.01);
(Continued)

(58) Field of Classification Search
CPC .......... F03D 9/002; F03D 1/001; F03D 11/04; Y02P 70/253; Y02E 10/728;
(Continued)

(56) References Cited

U.S. PATENT DOCUMENTS 4,478,532 A * 10/1984 Puro ........................ B25B 7/08
16/342
6,171,540 B1 * 1/2001 Ibaragi .................... B29C 45/00
248/200

(Continued)

FOREIGN PATENT DOCUMENTS

CN          1856644 A      11/2006
DE     102006001931 A1     7/2007
(Continued)

OTHER PUBLICATIONS

Decision to Grant a Patent dated Aug. 18, 2015, corresponding to Chinese Patent Application No. 201180051500.2.
(Continued)

*Primary Examiner* — Ninh H Nguyen
*Assistant Examiner* — Aaron R Eastman
(74) *Attorney, Agent, or Firm* — Kanesaka Berner and Partners LLP

(57) ABSTRACT

A structure for a nacelle cover connection portion of a wind turbine generator includes a lengthy first angled member fixed to an inside surface of a nacelle cover and forming an upper end portion of a side wall panel; and a lengthy second angled member fixed to the inside surface and forming a lower end portion of a roof panel. An upper surface of the first angled member and a lower surface of the second angled member are aligned with and fixed to each other. A covering portion covering the upper end portion from the outside of a nacelle is provided at a predetermined interval from the same and integral with the lower end portion so as (Continued)

to protrude to the outside of the nacelle cover farther than the lower end portion. A packing is interposed between the upper and lower surfaces.

8 Claims, 8 Drawing Sheets

(52) U.S. Cl.
CPC .......... *F05B 2240/14* (2013.01); *Y02B 10/30* (2013.01); *Y02E 10/728* (2013.01); *Y02P 70/523* (2015.11)

(58) Field of Classification Search
CPC ... Y02E 10/726; Y02B 10/30; F05B 2240/14; F05B 2230/604
USPC .......... 415/214.1, 208.1; 277/315, 602, 608, 277/626, 635, 644, 946
See application file for complete search history.

(56) References Cited

U.S. PATENT DOCUMENTS

| | | | | |
|---|---|---|---|---|
| 7,540,116 | B1 * | 6/2009 | Martinson | B60P 3/34 277/644 |
| 2003/0147753 | A1 * | 8/2003 | Ollgaard | E04H 12/085 416/244 A |
| 2007/0261353 | A1 * | 11/2007 | Cullen | E04F 13/04 52/590.2 |
| 2010/0101173 | A1 * | 4/2010 | Bagepalli | E04H 12/085 52/651.01 |
| 2010/0126115 | A1 * | 5/2010 | Lim | E04H 12/085 52/848 |
| 2010/0232977 | A1 * | 9/2010 | Mogensen | F03D 1/001 416/246 |
| 2010/0239416 | A1 * | 9/2010 | Mogensen | F03D 11/00 415/182.1 |
| 2014/0230343 | A1 * | 8/2014 | Lam | F03D 11/04 52/40 |
| 2015/0152881 | A1 * | 6/2015 | Tirumalai | F03D 11/005 415/1 |

FOREIGN PATENT DOCUMENTS

| | | |
|---|---|---|
| JP | 58-065977 A | 4/1983 |
| JP | 7-062758 A | 3/1995 |
| JP | 2008208643 A | 9/2008 |
| WO | 2007132408 A2 | 11/2007 |
| WO | 2009150162 A2 | 12/2009 |
| WO | 2010102635 A2 | 9/2010 |

OTHER PUBLICATIONS

Office Action issued Jan. 30, 2015, corresponding to Chinese patent application No. 201180051500.2.
International Search Report corresponding to PCT/JP2011/075171, dated Jan. 31, 2012.

* cited by examiner

STRUCTURE FOR NACELLE COVER CONNECTION PORTION OF WIND TURBINE GENERATOR

RELATED APPLICATIONS

The present application is a National Phase of International Application No. PCT/JP2011/075171, filed Nov. 1, 2011, and claims priority from Japanese Application Number 2010-245219, filed Nov. 1, 2010.

TECHNICAL FIELD

The present invention relates to a structure for a nacelle cover connection portion of a wind turbine generator.

BACKGROUND ART

A wind turbine generator is a device for generating power by a power generator driven by rotation of a rotor head provided with a turbine blade upon receipt a wind force and by increasing a speed of this rotation by an accelerator or the like. The rotor head is mounted on an end portion of a nacelle installed on a tower for a wind turbine, capable of yaw turning, and is supported rotatably around a rotation axis in a substantially horizontal lateral direction.

A nacelle cover covering the nacelle of a wind turbine generator is configured by connecting a plurality of panels, and a connection portion structure of this panel needs to be constructed such that penetration of rainwater from the outside of the nacelle cover into the inside can be prevented.

The connection portion of the panels is generally joined by a bolt, but if the nacelle cover is subjected to an external force due to wind pressure, snow fall or the like, the panel connection portion joined by this bolt becomes the weakest part in terms of strength. Therefore, the panel connection portion needs to have a structure in which a high material distortion does not occur.

General structures for a connection portion of wall surface panels include the one illustrated in Patent Document 1, for example.

CITATION LIST

Patent Literature

{PTL 1}
Japanese Unexamined Patent Application, Publication No. 7-62758

SUMMARY OF INVENTION

Technical Problem

During maintenance after installation of a wind turbine generator, large-sized equipment (accelerators, generators and the like) disposed in a nacelle cover is taken out of the nacelle cover. Thus, it is necessary to have a structure in which a part of the nacelle cover of the wine turbine generator can be easily removed and re-installed.

Particularly, a roof panel constituting a roof portion of the nacelle cover needs to have a structure that can be removed easily.

A structure for the connection portion of a wall surface panel illustrated in Patent Literature 1 is a structure for a connection portion of the wall surface panel used for houses and does not have a structure considering removal or re-installation of the wall surface panel.

Moreover, a work of removal or re-installation of the panel constituting the nacelle cover of the wind turbine generator is carried out at a high place/under an environment of strong wind but the connection portion structure of the wall surface panel illustrated in Patent Literature 1 is not a structure capable of handling removal/re-installation of the panel at a high place/under an environment of strong wind.

As the connection portion structure of the nacelle cover of a wind turbine generator, those illustrated in FIGS. 8 and 9 can be considered, for example.

However, in a simple lap joint method of the panel as illustrated in FIG. 8, during a work of overlapping a suspended upper panel (roof panel 104) over an upper end portion of a lower panel (side wall panel) 103 for installation, the upper end portion of the lower panel 103 interferes with a lower end portion of the upper panel 104, and the interference might damage the upper end portion of the lower panel 103 and the upper panel 104, which is not preferable.

Moreover, from the viewpoint of water-tightness, it is necessary to construct a water-proof material 180 such as a urethane foam or the like between an outer surface of the upper end portion of the lower panel 103 and an inner surface of the lower end portion of the upper panel 104. However, if the water-proof material 180 such as a urethane foam is constructed between the outer surface of the upper end portion of the lower panel 103 and the inner surface of the lower end portion of the upper panel 104, seal by the water-proof material 180 is broken each time the upper panel 104 is removed, and it is not a structure considering removal or re-installation of the upper panel 104.

Thus, as illustrated in FIG. 9, flanges 241 and 231 are provided on the lower end portion of the upper panel 204 and the upper end portion of the lower panel 203, respectively, so as to have a structure capable of removal or re-installation of the upper panel 204.

However, the panel of the nacelle cover is generally formed of a synthetic material such as fiber reinforced plastic (FRP) and if a flange is provided on the panel end portion, a molding cost of the panel increases. Moreover, by providing a flange serving as a projection portion, there is also a problem of deteriorating panel transport efficiency. Moreover, from the viewpoint of water-tightness, a packing 207 or the like needs to be disposed between the flanges 241 and 231.

Moreover, since both the panel connection portion structure of the lap joint method illustrated in FIG. 8 and the flange-type panel connection portion structure illustrated in FIG. 9 use bolts for joining the panels, if the panel is deformed by an external force of a wind pressure, worker walking on the panel, snow fall or the like, a high material distortion occurs at the connection portion of the panels in which a bolt hole is constructed, which makes the connection portion the weakest part in the nacelle cover.

The present invention was made in view of the above circumstances and has an object to provide a structure for a nacelle cover connection portion of a wind turbine generator in which removal or re-installation of the panel constituting the nacelle cover is considered, water-tightness in the panel connection portion is ensured, and strength of the panel connection portion is also high.

Solution to Problem

A structure for a nacelle cover connection portion of a wind turbine generator according to a first aspect of the present invention is a structure for a nacelle cover connection portion of a wind turbine generator, in which a lower panel constituting a lower part of each side wall of a nacelle cover covering a nacelle of a wind turbine generator and an upper panel constituting an upper part of the side wall are connected to each other, the structure comprising: a lengthy first frame member fixed to an inside surface of the nacelle cover and forming an upper end portion of the lower panel; a lengthy second frame member fixed to an inside surface of the nacelle cover and forming a lower end portion of the upper panel, the upper surface of the first frame member and the lower surface of the second frame member being aligned with and fixed to each other so as to connect the upper end portion of the lower panel and the lower end portion of the upper panel in substantially the same plane; a covering portion covering the upper end portion of the lower panel from the outside of the nacelle at a predetermined interval from the upper end portion of the lower panel, the covering portion being formed integrally with the lower end portion of the upper panel so as to protrude to the outside of the nacelle cover farther than the lower end portion of the upper panel; and a packing interposed between an upper surface of the first frame member and an lower surface of the second frame member.

According to the structure for a nacelle cover connection portion of a wind turbine generator according to the first aspect of the present invention, since the covering portion covering the upper end portion of the lower panel from the outside of the nacelle at a predetermined interval from the upper end portion of the lower panel is provided, and the covering portion is formed integrally with the lower end portion of the upper panel so as to protrude to the outside of the nacelle cover farther than the lower end portion of the upper panel, when the upper panel is to be connected to the lower panel while the upper panel is suspended, the end portions of the upper panel and the lower panel do not collide against and damage each other, and construction performance is favorable. Moreover, when the upper panel is to be connected to the lower panel, production errors of the panels can be also absorbed.

Moreover, since the aforementioned covering portion is formed integrally with the lower end portion of the upper panel so as to protrude to the outside of the nacelle cover farther than the lower end portion of the upper panel, rain water flowing from above to below of the nacelle cover flows along the outside of the covering portion to the outside of the lower panel.

Moreover, since a space between the first frame member and the second frame member joining the upper panel and the lower panel together is sealed by the packing, even if rain water blown up by crosswind penetrates into the covering portion, penetration of rain water or the like into a joint portion of the first frame member and the second frame member can be reliably prevented.

Moreover, during maintenance of devices in the nacelle, sealing performance by the packing is not lost even if the upper panel is removed and installed again. Furthermore, when the upper panel is to be positioned, even if the upper panel is moved the packing does not fall but follows the first frame member and the second frame member.

A structure for a nacelle cover connection portion of a wind turbine generator according to a second aspect of the present invention is a structure for a nacelle cover connection portion of a wind turbine generator, in which a lower panel constituting a lower part of each side wall of a nacelle cover covering a nacelle of a wind turbine generator and an upper panel constituting an upper part of the side wall are connected to each other, the structure comprising: a lengthy first frame member fixed to an inside surface of the nacelle cover and forming an upper end portion of the lower panel; a lengthy second frame member fixed to an inside surface of the nacelle cover and forming a lower end portion of the upper panel, an upper surface of the first frame member and a lower surface of the second frame member being aligned with and fixed to each other so as to connect the upper end portion of the lower panel and the lower end portion of the upper panel in substantially the same plane; and a covering portion covering the upper end portion of the lower panel from the outside of the nacelle at a predetermined interval from the upper end portion of the lower panel, the covering portion being formed integrally with the lower end portion of the upper panel so as to protrude to the outside of the nacelle cover farther than the lower end portion of the upper panel, in which a part of the upper end portion of the lower panel opposite to the lower end of the covering portion is formed so as to protrude toward the lower end of the covering portion.

According to the structure for a nacelle cover connection portion of a wind turbine generator according to the second aspect of the present invention, since the covering portion covering the upper end portion of the lower panel from the outside of the nacelle at a predetermined interval from the upper end portion of the lower panel is provided, and the covering portion is formed integrally with the lower end portion of the upper panel so as to protrude to the outside of the nacelle cover farther than the lower end portion of the upper panel, when the upper panel is to be connected to the lower panel while suspending the upper panel, the end portions of the upper panel and the lower panel do not collide against and damage each other, and construction performance is favorable. Moreover, when the upper panel is to be connected to the lower panel, production errors of the panels can be also absorbed.

Moreover, since the aforementioned covering portion is formed integrally with the lower end portion of the upper panel so as to protrude to the outside of the nacelle cover farther than the lower end portion of the upper panel, rain water flowing from above to below of the nacelle cover flows along the outside of the covering portion to the outside of the lower panel.

Moreover, since the part in the upper end portion of the lower panel opposite to the lower end of the covering portion is formed so as to protrude toward the lower end of the covering portion, penetration of rain water blown up by crosswind into the covering portion can be prevented.

Furthermore, water-proof performance between the upper panel and the lower panel is not lost even if the upper panel is removed and installed again during maintenance of the devices in the nacelle.

Still further, since the part in the upper end portion of the lower panel opposite to the lower end of the covering portion is formed so as to protrude toward the lower end of the covering portion, rigidity in the vicinity of the connection portion of the lower panel with the upper panel is improved by means of this protruding shape, deformation in handling of the panel is reduced, and an assembling work of the nacelle cover is facilitated.

In the structure for a nacelle cover connection portion of a wind turbine generator according to the first aspect or the second aspect of the present invention, it is preferably configured such that the first frame member is fixed to the lower panel with the upper surface of the first frame member being located above the upper end of the upper end portion of the lower panel, and the second frame member is fixed to the upper panel with the lower surface of the second frame member being located below the lower end of the lower end portion of the upper panel.

According to this configuration, since the first frame member is fixed to the lower panel with the upper surface of the first frame member being located above the upper end of the upper end portion of the lower panel, and the second frame member is fixed to the upper panel with the lower surface of the second frame member being located below the lower end of the lower end portion of the upper panel, when the upper panel is to be connected to the lower panel while the upper panel is suspended, the end portions of the upper panel and the lower panel do not collide against and damage each other, and construction performance is favorable.

Moreover, when the upper panel is to be connected to the lower panel, production errors of the panels can be also absorbed.

In the aforementioned structure for a nacelle cover connection portion of a wind turbine generator, it is preferably configured such that a step shape formed by the upper surface of the first frame member and the upper end of the upper end portion of the lower panel is sealed by a sealing material, and a step shape formed by the lower surface of the second frame member and the lower end of the lower end portion of the upper panel is sealed by a sealing material.

According to this configuration, since the step shape formed by the upper surface of the first frame member and the upper end of the upper end portion of the lower panel and the step shape formed by the lower surface of the second frame member and the lower end of the lower end portion of the upper panel are both sealed by a sealing material, penetration of water from the outside of the nacelle cover to the inside can be prevented more reliably.

In the structure for a nacelle cover connection portion of a wind turbine generator according to the first aspect or the second aspect of the present invention, it is preferably configured such that a length of the first frame member protruding to the inside of the nacelle is set longer than a length of the second frame member protruding to the inside of the nacelle, and a step shape formed inside the nacelle by a protruding end edge of the first frame member and a protruding end edge of the second frame member is sealed by a sealing material.

According to this configuration, since the length of the first frame member protruding to the inside of the nacelle is set longer than the length of the second frame member protruding to the inside of the nacelle, and the step shape formed inside the nacelle by a protruding end edge of the first frame member and a protruding end edge of the second frame member is sealed by a sealing material, penetration of water from the outside of the nacelle cover to the inside can be prevented more reliably.

In the structure for a nacelle cover connection portion of a wind turbine generator according to the first aspect or the second aspect of the present invention, it is preferably configured such that the first frame member is fastened to the upper end portion of the lower panel and the second frame member is fastened to the lower end portion of the upper panel by bolts through polytetrafluoroethylene washers, respectively.

According to this configuration, since the first frame member is fastened to the upper end portion of the lower panel and the second frame member is fastened to the lower end portion of the upper panel by bolts through polytetrafluoroethylene washers, respectively, penetration of water through bolt holes provided in the lower panel and the upper panel can be prevented.

In the aforementioned structure for a nacelle cover connection portion of a wind turbine generator, it is preferably configured such that a diameter of the polytetrafluoroethylene washer is not larger than a diameter of the bolt.

According to this configuration, since deformation such as breakage of the polytetrafluoroethylene washer at fastening of a bolt can be prevented, penetration of water through the bolt hole can be reliably prevented by the polytetrafluoroethylene washer.

In the structure for a nacelle cover connection portion of a wind turbine generator according to the first aspect or the second aspect of the present invention, it is preferably configured such that straight portions of the first frame member and the second frame member extending in their longitudinal directions are formed of metal and curved portions of the first frame member and the second frame member extending in their longitudinal directions are formed of fiber reinforced plastic.

According to this configuration, since straight portions of the first frame member and the second frame member extending in their longitudinal directions are formed of metal and curved portions of the first frame member and the second frame member extending in their longitudinal directions are formed of fiber reinforced plastic, by using a commercial frame member made of metal in the linear portions and by using a frame member made of fiber reinforced plastic only in a corner portion, a cost can be reduced and strength can be given as a whole.

Moreover, when wind hits from behind the nacelle, stress concentrates to the corner portion, but by using the frame member made of fiber reinforced plastic for this portion, stress concentration can be relaxed.

Advantageous Effects of Invention

According to the structure for a nacelle connection portion of a wind turbine generator according to the present invention, removal or re-installation and water-tightness in the panel connection portion constituting the nacelle cover are fully considered, and moreover, a function required as a panel constituting the nacelle cover that strength at the panel connection portion is high can be satisfied efficiently with a low cost.

DESCRIPTION OF EMBODIMENTS

Figure 1:
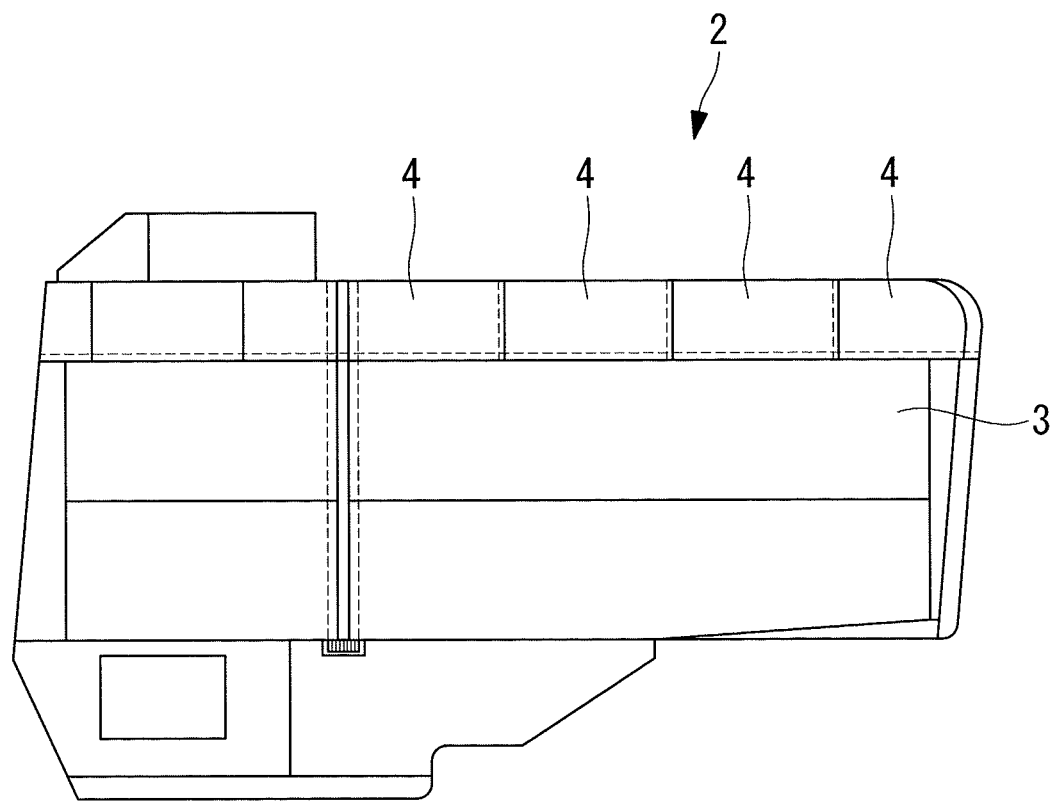
FIG. 1 is a side view of appearance illustrating a nacelle cover in which a structure for a nacelle cover connection portion of a wind turbine generator of the present invention is used.
Figure 2:
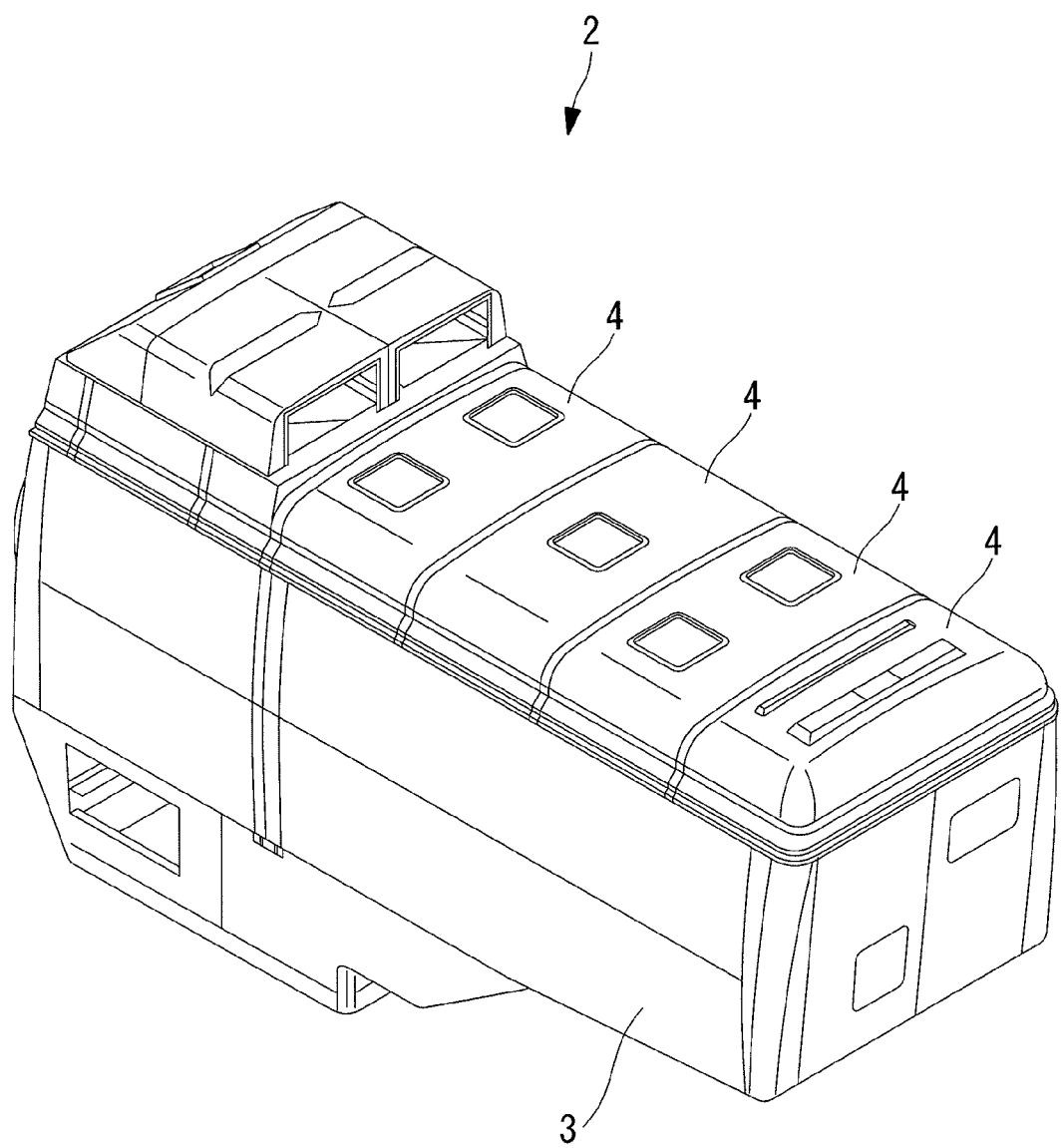
FIG. 2 is an appearance perspective view illustrating the nacelle cover in which the structure for a nacelle cover connection portion of a wind turbine generator of the present invention is used.
Figure 3:
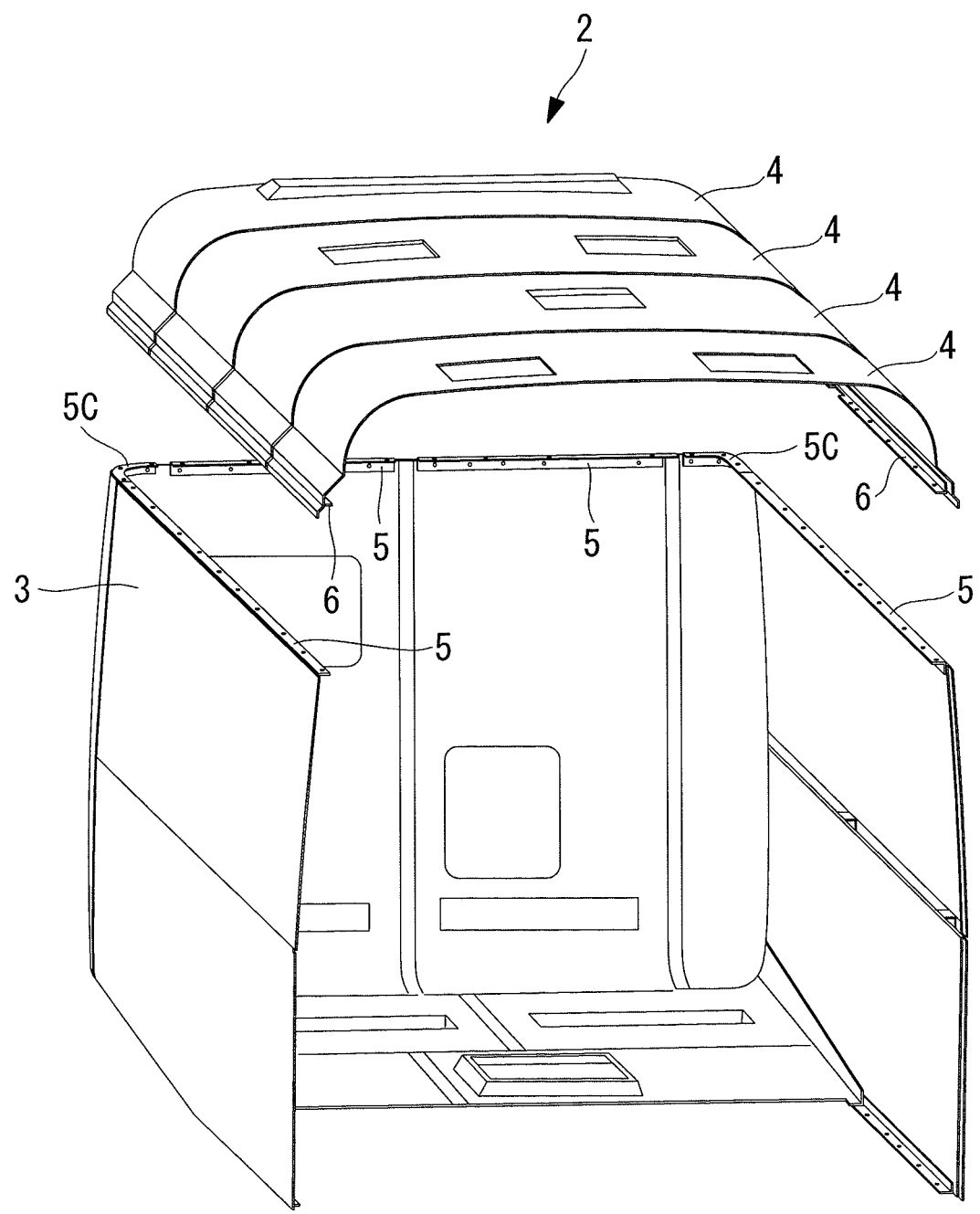
FIG. 3 is an exploded perspective view illustrating the nacelle cover in which the structure for a nacelle cover connection portion of a wind turbine generator of the present invention is used.

Embodiments of a structure for a nacelle cover connection portion of a wind turbine generator according to the present invention will be described below by referring to the attached drawings. FIGS. 1 to 3 illustrate construction examples of the nacelle cover to which the structure for a nacelle cover of a wind turbine generator according to the present invention is applied.

In each of the embodiments which will be described below, the structure for a nacelle cover connection portion of a wind turbine generator is applied to a nacelle cover 2 covering a nacelle of a wind turbine generator. The nacelle is installed on an upper end portion of a tower and accommodates devices such as an accelerator, a generator and the like connected to a rotor on which a turbine blade is mounted through a main shaft, and the nacelle cover 2 is a member forming an outer wall of the nacelle.

The structure for a nacelle cover connection portion which will be described below is used, when a plurality of roof panels (upper panels) 4, each having a substantially U-shaped section, are to be mounted on a pair of opposing right and left side wall panels (lower panels) 3 arranged in parallel with each other, so as to connect both side portions (end portions in the both right and left directions with respect to an axial direction of the main shaft) of the roof panels 4 and the side wall panels 3 to each other. In an illustrated configuration example, the roof panel 4 is divided into 4 parts in the axial direction of the main shaft, and both side portions of each of the roof panels 4 are mounted on the upper end portion of the side wall panel 3 installed upright in the vertical direction.

First Embodiment

Figure 4:
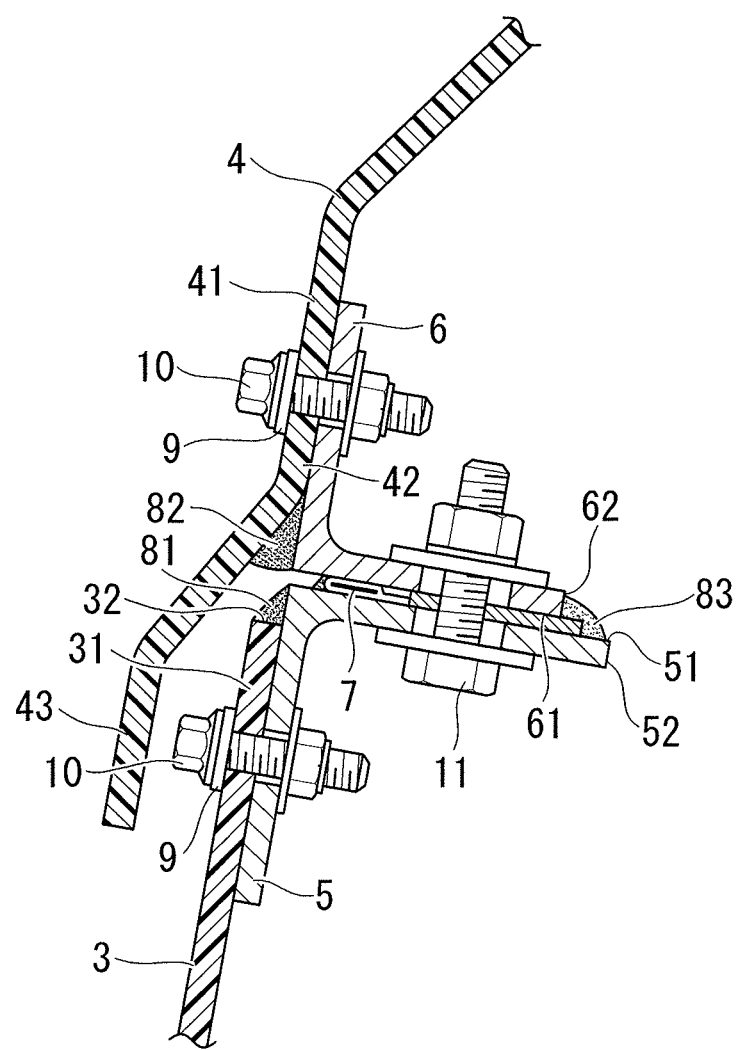
FIG. 4 is a sectional view of an essential part illustrating a structure for a nacelle cover connection portion of a wind turbine generator according to a first embodiment of the present invention.
Figure 5:
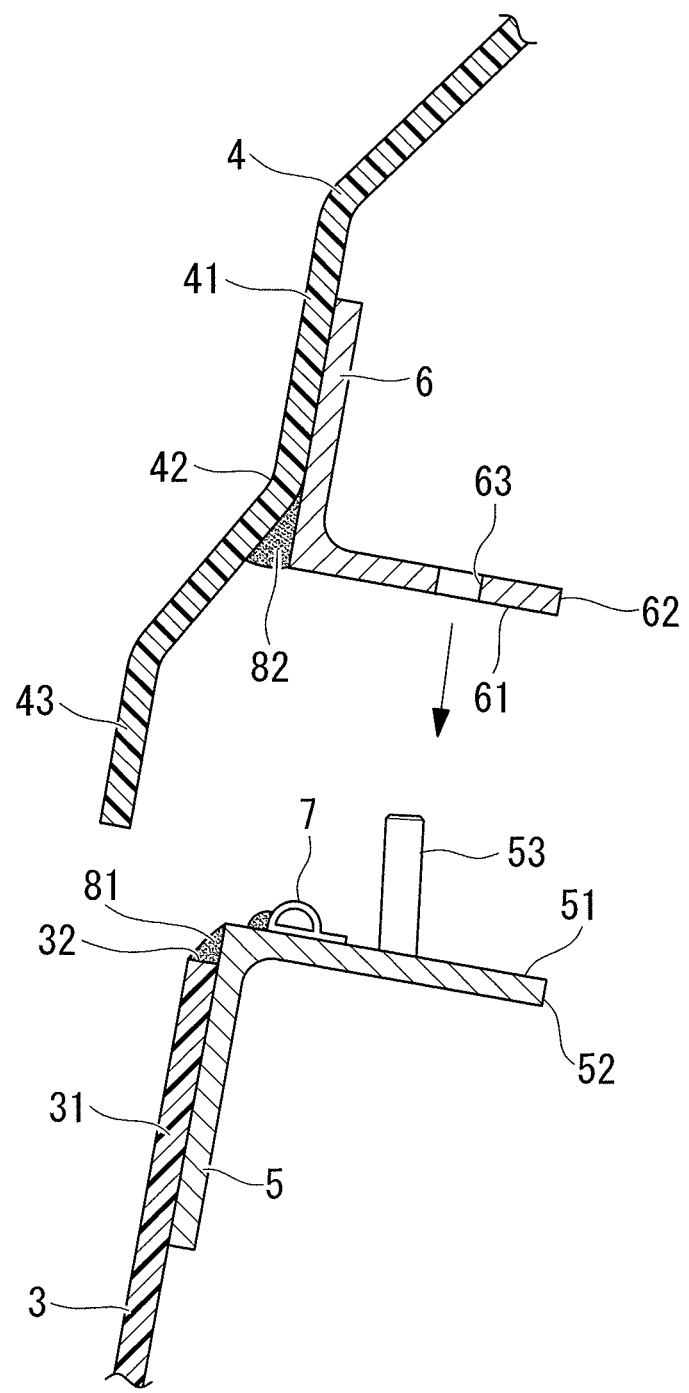
FIG. 5 is a sectional view of the essential part illustrating a state before mounting as the structure for a nacelle cover connection portion of a wind turbine generator according to the first embodiment of the present invention.
Figure 6:
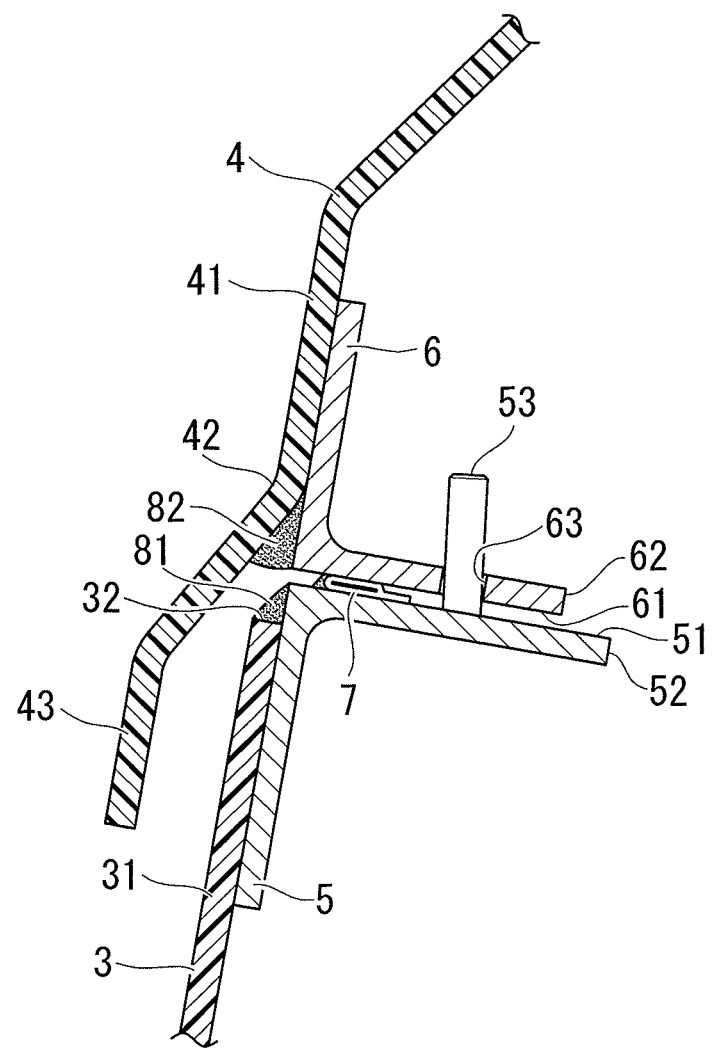
FIG. 6 is a sectional view of the essential part illustrating a state after mounting is completed as the structure for a nacelle cover connection portion of a wind turbine generator according to the first embodiment of the present invention.

Sectional views illustrated in FIGS. 4 to 6 show the structure of a nacelle cover connection portion of a wind turbine generator according to a first embodiment of the present invention.

In FIGS. 3 and 4, on an upper end portion 31 of the side wall panel 3 constituting the nacelle cover 2, a lengthy first angled member (first frame member) 5 is fixed to a surface (inner surface side of the nacelle) which is the inside of the =nacelle cover 2. Moreover, on a lower end portion 41 of the roof panel 4 constituting the nacelle cover 2, a lengthy second angled member (second frame member) 6 is fixed to the inner surface side of the nacelle cover 2.

When the roof panel 4 is to be mounted on the side wall panel 3, an upper surface 51 of the first angled member 5 and a lower surface 61 of the second angled member 6 are aligned with each other and fixed to each other with a bolt 11, the upper end portion 31 of the side wall panel 3 and the lower end portion 41 of the roof panel 4 are connected to each other on the substantially same plane. That is, in the structure for a connection portion of this embodiment, removal of the roof panel 4 required during maintenance which is a work at a high place on the tower is considered, and the side wall panel 3 and the roof panel 4 are joined together with the angled members 5 and 6 and the joined surface between the angled members 5 and 6 are sealed.

Moreover, on the roof panel 4, a covering portion 43 is provided by being formed integrally with the lower end portion 41 so as to protrude to the outside of the nacelle cover 2 farther than the lower end portion 41 of the roof panel 4. That is, the covering portion 43 is provided by extending the lower end portion 41 downward so as to expand the lower end outlet side to the outside. This covering portion 43 is a portion provided in order to cover a surface of the upper end portion 31 (nacelle outer wall surface) which is the outside of the nacelle cover 2 at a position at a predetermined interval in the outward direction of the nacelle cover 2 from the upper end portion 31 of the side wall panel 3 in a state where the roof panel 4 is mounted at a predetermined position.

Moreover, between the upper surface 51 of the first angled member 5 and the lower surface 61 of the second angled member 6, a packing 7 having a substantially P-shaped section, for example, is interposed.

The first angled member 5 is fixed to the nacelle inner surface side of the side wall panel 3 with its upper surface 51 being located above an upper end 32 of the upper end portion 31 of the side wall panel 3.

Moreover, the second angled member 6 is fixed to the roof panel 4 so that its lower surface 61 is located below a lower end 42 of the lower end portion 41 of the roof panel 4.

As a result, since a step shape is formed by the upper surface 51 of the first angled member 5 and the upper end 32 of the upper end portion 31 of the side wall panel 3, a sealing material 81 in which silicon or the like is filled, for example, is constructed on this step portion. This sealing material 81 prevents penetration of water into the nacelle through the joined surface between the side wall panel 3 and the first angled member 5.

Moreover, a gap or a step shape formed by the lower surface 61 of the second angled member 6 and the lower end 42 of the lower end portion 41 of the roof panel 4 is also sealed by a sealing material 82 in order to prevent penetration of water into the nacelle.

Moreover, regarding the aforementioned first angled member 5 and second angled member 6, lengths of the upper surface 51 and the lower surface 61 thereof are preferably set as follows.

That is, a length of the first angled member 5 protruding to the inside of the nacelle is set longer than a length of the second angled member 6 protruding to the inside of the nacelle, and in the joined surface between the first angled member 5 and the second angled member 6, a step shape formed by side edges 52 and 62 which are protruding end edge inside the nacelle is sealed by a sealing material 83 such as silicon or the like. This sealing material 83 prevents penetration of water if the packing 7 is broken.

In other words, since the length of the upper surface 51 protruding from the upper end portion 31 of the side wall panel 3 to the inside of the nacelle is longer than the length of the lower surface 62 protruding from the lower end portion 41 of the roof panel 4 to the inside of the nacelle, a step shape is formed by the side edge 52 serving as an end surface of the nacelle inner side in the vertical direction of the first angled member 5 and the side edge 62 serving as an end surface of the nacelle inner side in the vertical direction of the second angled member 6 as the first angled member protrudes longer in a direction to the nacelle inner side. In this embodiment, since the sealing material 83 is constructed by using this step shape, a space between the joined surfaces is sealed similarly to the aforementioned step shape, which serves as a measure against water penetration if the seal by the packing 7 is broken.

Since the space between the first angled member 5 and the second angled member 6 joining the upper and lower panels is sealed by the packing 7 having the substantially P-shaped section, even if the roof panel 4 is removed and then, installed again during maintenance of the devices in the nacelle, for example, sealing performance by the packing 7 is not lost, unlike seal by a urethane foam or the like.

Moreover, even if the roof panel 4 is moved for positioning in installation of the roof panel 4, the packing 7 does not drop but follows the angled members 5 and 6 and maintains the sealing function.

When the roof panel 4 is to be mounted on the side wall panel 3, as illustrated in FIGS. 5 and 6, the work can be carried out easily and reliably by using a positioning pin 53 and a pin hole 63. This positioning pin 53 protrudes upward from the upper surface 51 of the first angled member 5 and is disposed in plural at positions shifted from the bolt 11 for joining the angled members 5 and 6. Moreover, the pin hole 63 is a through hole drilled in the lower surface 61 of the second angled member 6 and is arranged so that the positioning pin 53 passes therethrough at a predetermined roof panel mounting position.

By providing such positioning pin 53 and pin hole 63 in advance, the covering portion 43 provided on the lower end portion side of the roof panel 4 is lowered to a predetermined position (See FIG. 6) without interference with the side wall panel 3 by lowering the roof panel 4 from a state before mounting illustrated in FIG. 5 and positioning the same so that the positioning pin 53 passes through the pin hole 63. Therefore, the roof panel 4 can be easily positioned and mounted at a predetermined position of the lower panel 3.

The first angled member 5 is fastened to the upper end portion 31 of the side wall panel 3 and the second angled member 6 to the lower end portion 41 of the roof panel 4 by bolts 10 through polytetrafluoroethylene washers 9, respectively. The polytetrafluoroethylene washer 9 is a component molded from a polytetrafluoroethylene resin (fluorine resin) such as TEFLON (registered trademark) and is flexible and excellent in heat resistance and chemical resistance. Thus, employment of the polytetrafluoroethylene washer 9 is effective in waterproof treatment of a bolt fastening portion.

The aforementioned polytetrafluoroethylene washer 9 is preferably set so that its outer diameter is not more than a diameter of a seat surface of the bolt 10. That is because, as illustrated in FIG. 4, if the polytetrafluoroethylene washer 9 has a diameter larger than the seat surface of the bolt 10, there is a concern of breakage from a contact surface with the bolt seat surface (particularly, the vicinity of an outer peripheral end of the bolt seat surface) due to biased contact during bolt fastening.

Straight portions of the first angled member 5 and the second angled member 6 extending in the longitudinal directions thereof are formed of metal such as steel. Moreover, curved portion of the first angled member 5 and the second angled member 6 extending in the longitudinal directions thereof, that is, corner portions 5C illustrated in FIG. 3 are formed of fiber reinforced plastic (FRP).

As mentioned above, both metal and fiber reinforced plastic are separately used because a metal angled member made of steel or the like and following the curve is an order made component though a metal material such as steel is preferable in view of the strength.

As described above, in the structure for a nacelle cover connection portion of the aforementioned embodiment, in addition to workability in removal or re-installation of the roof panel 4 constituting the nacelle cover 2, water-tightness in the connection portion between the side wall panel 3 and the roof panel 4 are sufficiently considered. Moreover, since the structure for a nacelle cover connection portion of the aforementioned embodiment can ensure high strength also in the panel connection portion between the side wall panel 3 and the roof panel 4, functions required as the panel constituting the nacelle cover 2 can be satisfied efficiently and with a low cost.

Particularly, the size of the recent wind turbine generators is increasing, and an increasing number of nacelles are being installed at a high place of approximately 100 m from the ground. Thus, an assembling work of the nacelle, a maintenance work of the devices in the nacelle and the like will be also increasingly carried out at high places, and it is greatly meaningful if removal or re-installation of the roof panel 4 can be carried out easily while interference with each other which might cause damage is prevented.

Second Embodiment

Figure 7:
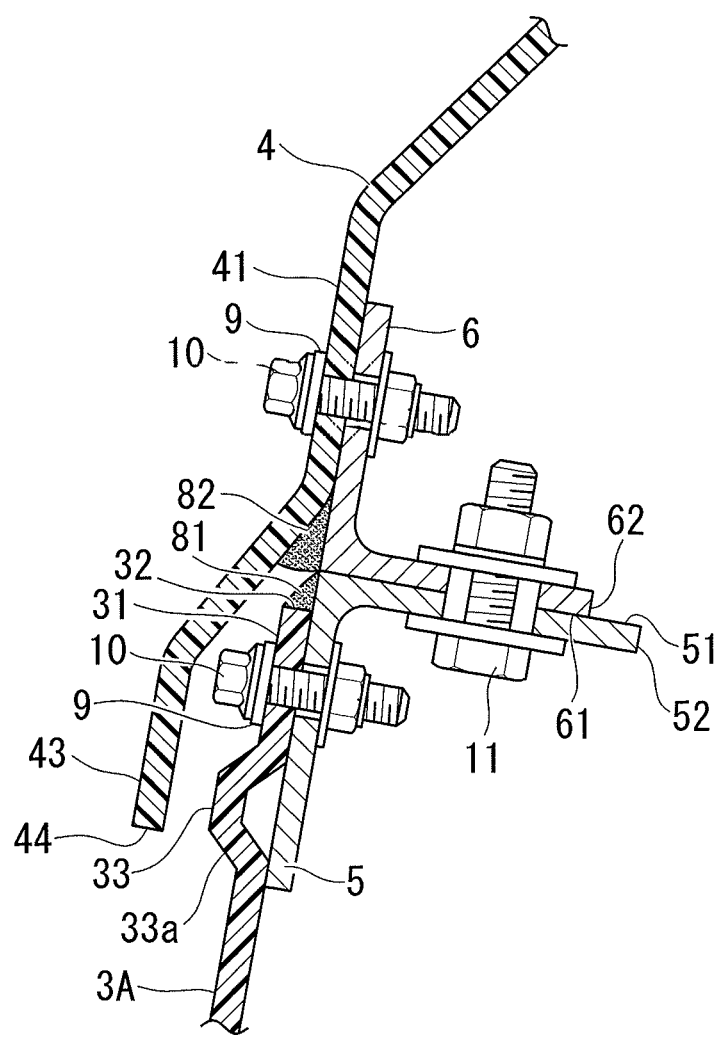
FIG. 7 is a sectional view of an essential part illustrating a structure for a nacelle cover connection portion of a wind turbine generator according to a second embodiment of the present invention.
Figure 8:
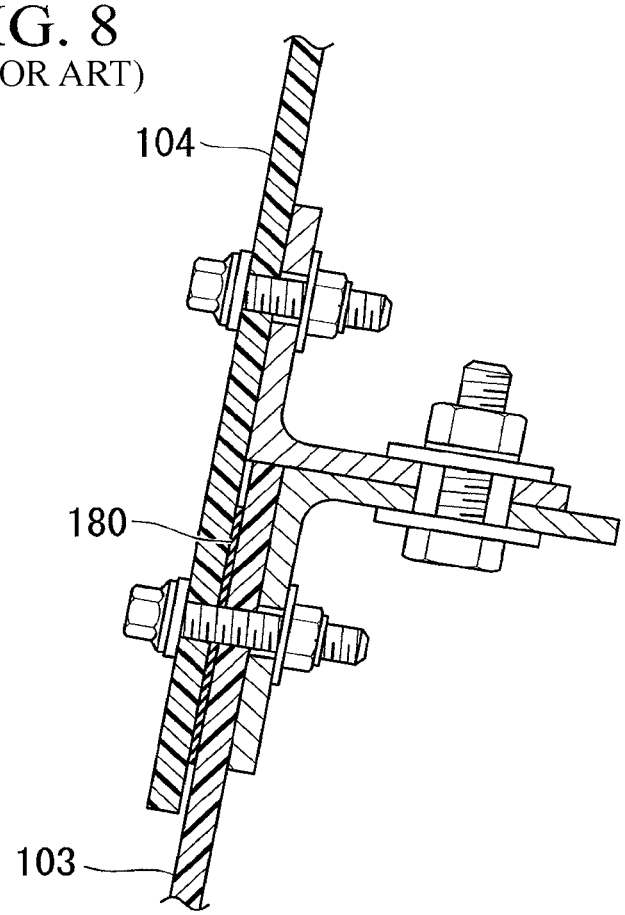
FIG. 8 is a sectional view of an essential part illustrating an example of a prior-art structure according to a structure for a nacelle cover connection portion of a wind turbine generator.
Figure 9:
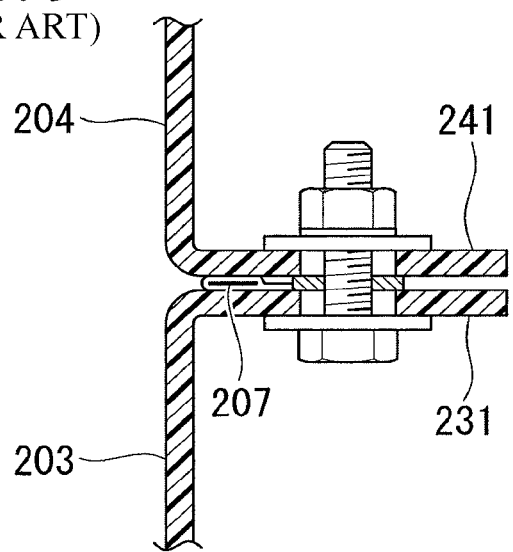
FIG. 9 is a sectional view illustrating another example of a prior-art structure according to a structure for a nacelle cover connection portion of a wind turbine generator.

Subsequently, a structure for a nacelle cover connection portion of a wind turbine generator according to a second embodiment of the present invention will be described by referring to FIG. 7. The same reference numerals are given to the portions similar to those in the aforementioned embodiment, and detailed explanation will be omitted.

The structure for a nacelle cover connection portion of this embodiment is configured substantially similarly to the structure for a nacelle connection portion of the first embodiment but has a configuration different in the following points.

That is, the upper end portion 31 of a side wall panel 3A is formed such that a part of the portion located at a position opposite to the lower end of the covering portion 43 becomes a swollen portion 33 and protrudes toward the lower end 44 of the covering portion 43. Thus, the lower end 44 of the covering portion 43 is at substantially the same level as the swollen portion 33, and at a lower end inlet portion of the covering portion 43, an opening area is narrowed by the swollen portion 33.

Moreover, in the first embodiment, the packing 7 having the P-shaped section is interposed between the upper surface 51 of the first angled member 5 and the lower surface 61 of the second angled member 6, but in this embodiment, the packing between the upper surface 51 of the first angled member 5 and the lower surface 61 of the second angled member 6 is omitted. Therefore, the lower surface 61 of the second angled member 6 is boded to the upper surface 51 of the first angled member 5 in a direct contact state.

By employing such configuration, the swollen portion 33 makes obstacle and prevents rain water blown up from the lower end 44 side of the covering portion 43 from penetrating into the nacelle. That is, since rain water to penetrate from the lower end 44 side of the covering portion 43 hits the surface of the swollen portion 33 and falls down from the wall surface due to the gravity, it cannot reach the joined surface between the upper surface 51 of the first angled member 5 and the lower surface 61 of the second angled member 6 and thus, penetration into the nacelle is prevented.

Particularly, by setting the lower end 44 of the covering portion 43 at substantially the same level as an inclined surface 33a of the swollen portion 33, that is, by setting it at substantially the same level as the inclined surface 33a having the upper end portion side expanded toward the back surface side of the covering portion 43, rain water guided by the inclined surface 33a of the swollen portion 33 hits the back surface (inner surface) of the covering portion 43 and falls down by the gravity, and penetration of rain water can be prevented more reliably.

The length of the covering portion 43 and the position, protrusion amount and the like of the swollen portion 33 may be set at optimal values by considering various conditions.

Moreover, the swollen portion 33 of this embodiment is effective not only as the aforementioned function of preventing penetration of rain water but also in improvement of rigidity of a side wall panel 3A. That is, since the swollen portion 33 having a projecting sectional shape is formed in the vicinity of a joint portion of the side wall panel 3A to be connected to the roof panel 4, panel rigidity is improved and deformation becomes difficult, which improves workability in assembling and the like.

Furthermore, the aforementioned swollen portion 33 is preferably constituted by combination of straight lines having bent points rather than a curved surface such as an arc from the viewpoint of fabrication of the panel or water drainage performances. The illustrated swollen portion 33 is formed having a substantially trapezoidal sectional shape having four bent points by combining three straight lines.

Moreover, in a space which becomes a turbulence area of blown-up rain water, that is, in a space on the inner surface side of the covering portion 43 and above the swollen portion 33, it is preferable to form fine irregularities on the wall surface forming the space. Since such irregularities make a flow in the space fine turbulent flows, a strong flow of rain water flowing toward the joined surface between the angled members 5 and 6 becomes difficult to be formed, and thus, penetration of rain water into the nacelle can be prevented more reliably.

As mentioned above, by employing the structure for a nacelle cover connection portion of this embodiment, too, in addition to the workability in removal and re-installation of the roof panel 4 constituting the nacelle cover 2, watertightness in the connection portion between the side wall panel 3A and the roof panel 4 is sufficiently considered. Moreover, since the structure for a nacelle cover connection portion of this embodiment can ensure high strength also in the panel connection portion between the side wall panel 3A and the roof panel 4, functions required as the panel constituting the nacelle cover 2 can be satisfied efficiently and with a low cost.

The embodiments of the present invention were described in detail by referring to the attached drawings, but specific configurations are not limited to the embodiments but naturally include design changes and the like made within a range not departing from the gist of the present invention. For example, in the second embodiment, a packing between the upper surface 51 of the first angled member 5 and the lower surface 61 of the second angled member 6 is omitted, but a packing may be provided between the upper surface 51 of the first angled member 5 and the lower surface 61 of the second angled member 6 without omitting it.

REFERENCE SIGNS LIST 2 nacelle cover
3, 3A side wall panel (lower panel)
4 roof panel (upper panel)
5 first angled member (frame member)
6 second angled member (frame member)
7 packing
9 polytetrafluoroethylene washer
10 bolt
31 upper end portion
32 upper end
33 swollen portion
41 lower end portion
42 lower end
43 covering portion
44 lower end
51 upper surface
61 lower surface
81, 82, 83 sealing material

The invention claimed is:

1. A structure for a nacelle cover connection portion of a wind turbine generator, wherein a lower panel constituting a lower part of each side wall of a nacelle cover covering a nacelle of a wind turbine generator and an upper panel constituting an upper part of said side wall are connected to each other, the structure comprising:
    a first frame member fixed to an inside surface of said nacelle cover and forming an upper end portion of said lower panel;
    a second frame member fixed to an inside surface of said nacelle cover and forming a lower end portion of said upper panel, the upper surface of said first frame member and the lower surface of said second frame member being aligned with and fixed to each other so as to connect the upper end portion of said lower panel and the lower end portion of said upper panel in substantially the same plane;
    a covering portion covering the upper end portion of said lower panel which forms an outer wall of the nacelle cover from the outside of the nacelle at a predetermined interval in an outward direction of the nacelle cover from the upper end portion of said lower panel, the covering portion being formed integrally with the lower end portion of said upper panel so as to protrude to the outside of said nacelle cover farther than the lower end portion of said upper panel; and
    a packing interposed between an upper surface of said first frame member and a lower surface of said second frame member; and
    a plurality of bolts fastening said first frame member to the upper end portion of said lower panel,
    wherein heads of said bolts are arranged in a space formed between the upper end portion of said lower panel and said covering portion,
    a thickness of the covering portion and the lower end portion are the same, and
    a thickness of the upper end portion and the lower panel are the same.

2. The structure for a nacelle cover connection portion of a wind turbine generator according to claim 1, wherein
    said first frame member is fixed to said lower panel with the upper surface of said first frame member being located above the upper end of the upper end portion of said lower panel, and
    said second frame member is fixed to said upper panel with the lower surface of said second frame member being located below the lower end of the lower end portion of said upper panel.

3. The structure for a nacelle cover connection portion of a wind turbine generator according to claim 2, wherein a step shape formed by the upper surface of said first frame member and the upper end of the upper end portion of said lower panel is sealed by a sealing material; and a step shape formed by the lower surface of said second frame member and the lower end of the lower end portion of said upper panel is sealed by a sealing material.

4. The structure for a nacelle cover connection portion of a wind turbine generator according to claim 1, wherein a length of said first frame member protruding to the inside of the nacelle is set longer than a length of said second frame member protruding to the inside of the nacelle, and a step shape formed inside the nacelle by a protruding end edge of said first frame member and a protruding end edge of said second frame member are sealed by a sealing material.

5. The structure for a nacelle cover connection portion of a wind turbine generator according to claim 1, wherein said first frame member is fastened to the upper end portion of said lower panel and said second frame member is fastened to the lower end portion of said upper panel by bolts through polytetrafluoroethylene washers, respectively.

6. The structure for a nacelle cover connection portion of a wind turbine generator according to claim 5, wherein a diameter of said polytetrafluoroethylene washer is not larger than a diameter of said bolt.

7. The structure for a nacelle cover connection portion of a wind turbine generator according to claim 1, wherein straight portions of said first frame member and said second frame member extending in longitudinal directions of said first frame member and said second frame member are formed of metal and curved portions of said first frame member and said second frame member extending in the longitudinal directions are formed of fiber reinforced plastic.

8. A structure for a nacelle cover connection portion of a wind turbine generator, wherein a lower panel constituting a lower part of each side wall of a nacelle cover covering a nacelle of a wind turbine generator and an upper panel constituting an upper part of said side wall are connected to each other, the structure comprising:

a first frame member fixed to an inside surface of said nacelle cover and forming an upper end portion of said lower panel;

a second frame member fixed to an inside surface of said nacelle cover and forming a lower end portion of said upper panel, an upper surface of said first frame member and a lower surface of said second frame member being aligned with and fixed to each other so as to connect the upper end portion of said lower panel and the lower end portion of said upper panel in substantially the same plane;

a covering portion covering the upper end portion of said lower panel from the outside of the nacelle at a predetermined interval from the upper end portion of said lower panel, the covering portion being formed integrally with the lower end portion of said upper panel so as to protrude to the outside of said nacelle cover farther than the lower end portion of said upper panel; and a plurality of bolts fastening the first frame member to the upper end portion of the lower panel, wherein a part of the upper end portion of said lower panel opposite to the lower end of said covering portion is formed so as to protrude toward the lower end of said covering portion and to narrow an opening area of a space formed between the upper end portion of said lower panel and said covering portion, a thickness of the covering portion and the lower end portion are the same, and a thickness of the upper end portion and the lower panel are the same.

* * * * *